(12) United States Patent
Ono

(10) Patent No.: US 8,212,877 B2
(45) Date of Patent: Jul. 3, 2012

(54) IMAGE CAPTURING SYSTEM, IMAGE CAPTURING METHOD, AND COMPUTER PROGRAM PRODUCT AT WHICH AN IMAGE IS CAPTURED AT A PREDETERMINED TIME

(75) Inventor: Shuji Ono, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 1128 days.

(21) Appl. No.: 12/040,099

(22) Filed: Feb. 29, 2008

(65) Prior Publication Data

US 2008/0211916 A1 Sep. 4, 2008

(30) Foreign Application Priority Data

Mar. 2, 2007 (JP) ................................. 2007-053482
Dec. 27, 2007 (JP) ................................. 2007-338184

(51) Int. Cl.
*H04N 5/33* (2006.01)
(52) U.S. Cl. ...................................... 348/164; 348/162
(58) Field of Classification Search .................. 348/162, 348/164
See application file for complete search history.

(56) References Cited

U.S. PATENT DOCUMENTS

| 2004/0170304 A1* | 9/2004 | Haven et al. | 382/115 |
| 2007/0003105 A1* | 1/2007 | Nakamura et al. | 382/103 |
| 2007/0024710 A1* | 2/2007 | Nakamura | 348/143 |
| 2010/0079282 A1* | 4/2010 | Icove et al. | 340/561 |

* cited by examiner

Primary Examiner — Mohamed Wasel
(74) Attorney, Agent, or Firm — Sughrue Mion, PLLC

(57) ABSTRACT

Visible light image capturing is performed at appropriate timing that corresponds to the action of a subject. An image capturing system includes: an infrared light image capturing section that successively captures a plurality of infrared light images of a subject, using infrared light; a timing predicting section that predicts timing at which the subject included in the plurality of infrared light images matches a predetermined condition, based on timing at which each of the plurality of infrared light images is captured and image content of the plurality of infrared light images; and a visible light image capturing section that captures a visible light image by using visible light at the timing predicted by the timing predicting section.

23 Claims, 11 Drawing Sheets

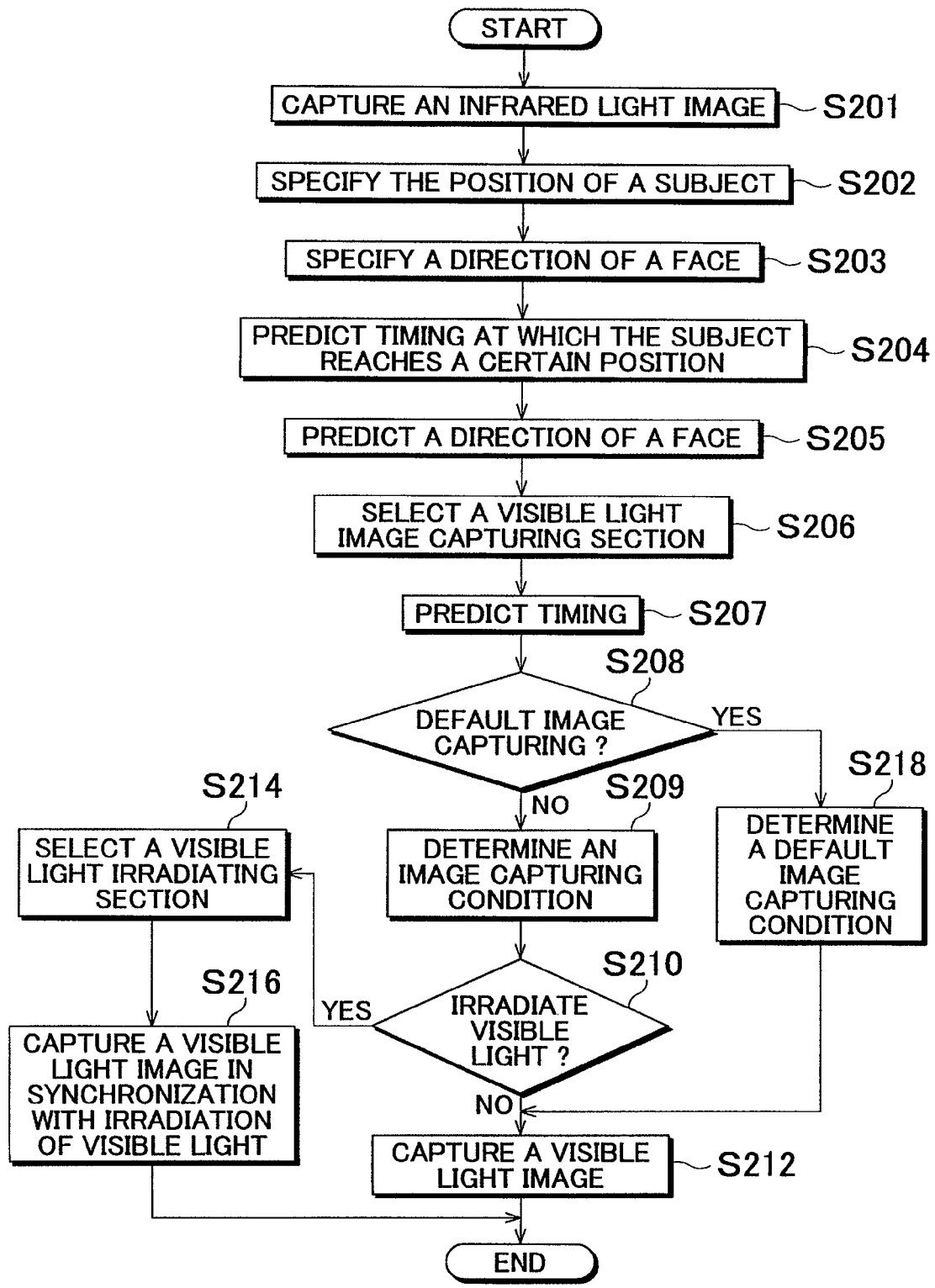
F I G. 10

IMAGE CAPTURING SYSTEM, IMAGE CAPTURING METHOD, AND COMPUTER PROGRAM PRODUCT AT WHICH AN IMAGE IS CAPTURED AT A PREDETERMINED TIME

CROSS REFERENCE TO RELATED APPLICATION

The present application claims priority from Japanese Patent Applications No. 2007-053482 filed on Mar. 2, 2007, and No. 2007-338184 filed on Dec. 27, 2007, the contents of which are incorporated herein by reference.

BACKGROUND

1. Technical Field

The present invention relates to an image capturing system, an image capturing method, and a computer program product. In particular, the present invention relates to an image capturing system, an image capturing method, and a computer program product for predicting timing at which a subject satisfies a predetermined condition from an infrared light image, and for capturing a visible light image at the predicted timing.

2. Description of the Related Art

The patent document 1 and the patent document 2 recite an image capturing apparatus for detecting an invader by means of near infrared light image capturing, and performing visible light image capturing when having found an invader. In addition, the patent document 3 recites a human-body detection method of simultaneously capturing a visible light image and a far infrared light image and specifying an image having the form of an animal outline recognized from the far infrared light image, from the visible light image. The patent document 4 recites a face image data loading method for detecting that a target person is facing toward a predetermined direction by detecting the infrared light from the amphiblestrode of a target person.

[Patent Document 1] Japanese Patent Application Publication No. 2001-275021
[Patent Document 2] Japanese Patent Application Publication No. 2000-175176
[Patent Document 3] Japanese Patent Application Publication No. 2004-219277
[Patent Document 4] Japanese Patent No. 3119558

SUMMARY

However, the image capturing system used as a monitoring camera is required to capture an image having high admissibility of evidence, such as an image in which the face of an invader is captured large and an image focused on an invader for identifying an invader. For this purpose, it is essential to capture a visible light image at appropriate timing that is in accordance with the action of the subject.

Therefore, it is an object of an aspect of the innovations herein to provide an image capturing system, an image capturing method, and a computer program product which are capable of overcoming the above drawbacks accompanying the related art. The above and other objects can be achieved by combinations described in the independent claims. The dependent claims define further advantageous and exemplary combinations of the innovations herein.

Therefore, in the first aspect related to the innovations herein, one exemplary image capturing system includes an infrared light image capturing section that successively captures a plurality of infrared light images of a subject, by means of infrared light; a timing predicting section that predicts timing at which the subject included in the plurality of infrared light images matches a predetermined condition, based on timing at which each of the plurality of infrared light images is captured and image content of the plurality of infrared light images; and a visible light image capturing section that captures a visible light image by means of visible light at the timing predicted by the timing predicting section.

In the second aspect related to the innovations herein, one exemplary image capturing method includes: an infrared light image capturing step of successively capturing a plurality of infrared light images of a subject, by means of infrared light; a timing predicting step of predicting timing at which the subject included in the plurality of infrared light images matches a predetermined condition, based on timing at which each of the plurality of infrared light images is captured and image content of the plurality of infrared light images; and a visible light image capturing step of capturing a visible light image by means of visible light at the timing predicted in the timing predicting step.

In the third aspect related to the innovations herein, one exemplary computer program product for an image capturing system, the product having computer instructions, recordable on a computer readable medium, enables a computer executing the computer instructions to cause the image capturing system to function as: an infrared light image capturing section that successively captures a plurality of infrared light images of a subject, by means of infrared light; a timing predicting section that predicts timing at which the subject included in the plurality of infrared light images matches a predetermined condition, based on timing at which each of the plurality of infrared light images is captured and image content of the plurality of infrared light images; and a visible light image capturing section that captures a visible light image by means of visible light at the timing predicted by the timing predicting section.

The summary of the invention does not necessarily describe all necessary features of the present invention. The present invention may also be a sub-combination of the features described above.

According to the innovations herein, it becomes possible to capture a visible light image at appropriate timing by predicting the action of the subject, from the image content included in an infrared light image.

BRIEF DESCRIPTION OF THE DRAWINGS

FIG. 10 shows one example of a flowchart showing an operation of the image capturing system 100.

DESCRIPTION OF EXEMPLARY EMBODIMENTS

The invention will now be described based on the preferred embodiments, which do not intend to limit the scope of the present invention, but exemplify the invention. All of the features and the combinations thereof described in the embodiment are not necessarily essential to the invention.

Figure 1:
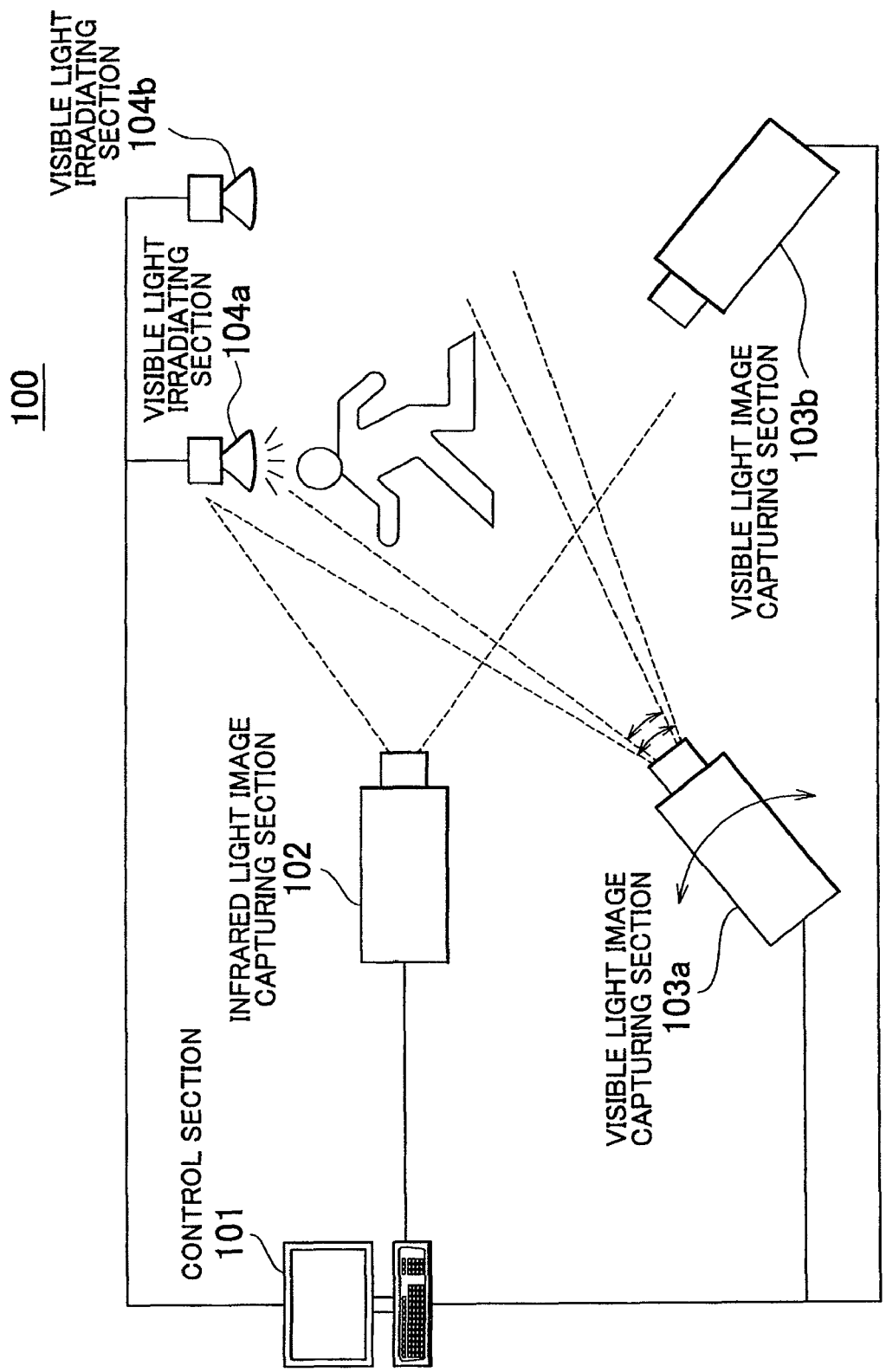
FIG. 1 shows an entire configuration of an image capturing system 100 according to one embodiment of the present invention.

FIG. 1 shows an entire configuration of an image capturing system 100 according to one embodiment of the present invention. The image capturing system 100 includes an infrared light image capturing section 102 for capturing an image of a monitor region by means of infrared light, a visible light image capturing section 103a and a visible light image capturing section 103b for capturing an image of a monitor region by means of visible light (hereinafter collectively referred to as "visible light image capturing section 103"), a visible light irradiating section 104a and a visible light irradiating section 104b (hereinafter collectively referred to as "visible light irradiating section 104"), an infrared light image capturing section 102, a visible light image capturing section 103, and a control section 101 for controlling the visible light irradiating section 104.

The control section 101 receives an infrared light image captured by the infrared light image capturing section 102, from the infrared light image capturing section 102. The control section 101 detects a subject included in a plurality of infrared light images, based on the content of the received infrared light images. The control section 101 predicts timing at which the detected subject matches a predetermined condition. Then the control section 101 controls the visible light image capturing section 103 to capture an image of the subject at the predicted timing. During this operation, the control section 101 selects, as a priority, one of a plurality of visible light image capturing sections 103 that is capable of capturing an image of the subject from a more appropriate angle, and controls thus selected visible light image capturing section 103 to capture an image of the subject.

In addition, the control section 101 determines the brightness of a monitor region at the timing at which the visible light image capturing section 103 performs image capturing, based upon the current brightness of the monitor region. For example, the image capturing system 100 has a sensor for measuring the brightness of an image capturing range of the visible light image capturing section 103, and the control section 101 determines whether the brightness is sufficient or not, according to the measured value of the sensor. When determining that the brightness is insufficient for image capturing performed by the visible light image capturing section 103, the control section 101 instructs the visible light irradiating section 104 to irradiate visible light. The control section 101 instructs the image capturing and the light irradiation, so as to simultaneously pursue the image capturing by the visible light image capturing section 103 and the light irradiation by the visible light irradiating section 104. A CdS (cadmium sulfide cell), an amorphous silicon semiconductor visible light sensor, or the like may be used as the sensor. Note that when the selected visible light image capturing section 103 pursues image capturing, the control section 101 selects, as a priority, one of a plurality of visible light irradiating sections 104 that is capable of irradiating visible light from a more appropriate angle to a subject whose image is to be captured by the selected visible light image capturing section 103, and controls thus selected visible light irradiating section 104 to irradiate visible light.

The visible light image capturing section 103 captures an image of a subject at the timing predicted by the control section 101, and therefore is able to capture an image of a subject that is predicted to match a predetermined condition. Moreover, since it becomes unnecessary to execute image capturing other than at the timing predicted to match the predetermined condition, the visible light image capturing section 103 is able to reduce the image data amount, compared to a case where the image of a monitor region is always captured, or to a case where the image capturing is started in response to sensing of the infrared light of the subject. Moreover, even when the brightness of the monitor region is insufficient for image capturing to be performed by the visible light image capturing section 103, the control section 101 is able to control the visible light irradiating section 104 to irradiate visible light to enable image capturing of a clear image of a subject in collaboration. Furthermore, the visible light irradiation by the visible light irradiating section 104 is performed in synchronization with and exclusively at the time of the image capturing of a subject by the visible light image capturing section 103, and therefore it is possible to execute the image capturing of the subject by the visible light image capturing section 103 without causing the subject to notice the image capturing.

Note that the image capturing system 100 may include a plurality of infrared light image capturing sections 102 for monitoring one monitor region. Each of the plurality of infrared light image capturing sections 102 captures an image of a plurality of image capturing regions within a monitor region, so that the plurality of infrared light image capturing sections 102 capture the entire image of the monitor region. In this case, it is preferable that there is no blind corner in the monitor region, where the blind corner is a portion that is not included in any of the image capturing regions of the plurality of infrared light image capturing sections 102.

In addition, the plurality of visible light image capturing sections 103 may capture an image of a monitor region for monitoring the monitor region. Each of the plurality of visible light image capturing sections 103 performs image capturing to a plurality of different image capturing regions in the monitor region respectively, so that the plurality of visible light image capturing regions 103 collaborate to capture the entire image of the monitor region. In this case, it is preferable that there is no blind corner in the monitor region, where the blind corner is a portion that is not included in any of the image capturing regions of the plurality of infrared light image capturing sections 103. The visible light image capturing sections 103 may capture a motion image that contains motion image constituting images such as a frame image, a field image, etc., not limited to a still image.

Furthermore, the infrared light image capturing section 102 and the visible light image capturing section 103 may be formed as an integral configuration, and be installed in the same case. In addition, each of the infrared light image capturing section 102 and the visible light image capturing section 103 may have an optical unit for imaging the light from a subject and an image capturing device such as a CCD and a CMOS.

In addition, one image capturing unit having one optical system and one image capturing device may be equipped with a function of the infrared light image capturing section 102 and the visible light image capturing section 103. In this case, one image capturing device has a configuration in which a plurality of pixels for subjecting the visible light to photoelectric conversion, and a plurality of pixels for subjecting the infrared light to photoelectric conversion are arranged.

In addition, one image capturing unit having one optical system and two image capturing devices may be equipped with a function of the infrared light image capturing section 102 and the visible light image capturing section 103. In this case, the image capturing unit includes one optical system that contains a spectroscope for dividing the light from the subject, an image capturing device for infrared light for receiving a portion of the light resulting from division by the spectroscope, and an image capturing device for visible light for receiving the other portion of the light resulting from division by the spectroscope.

Figure 2:
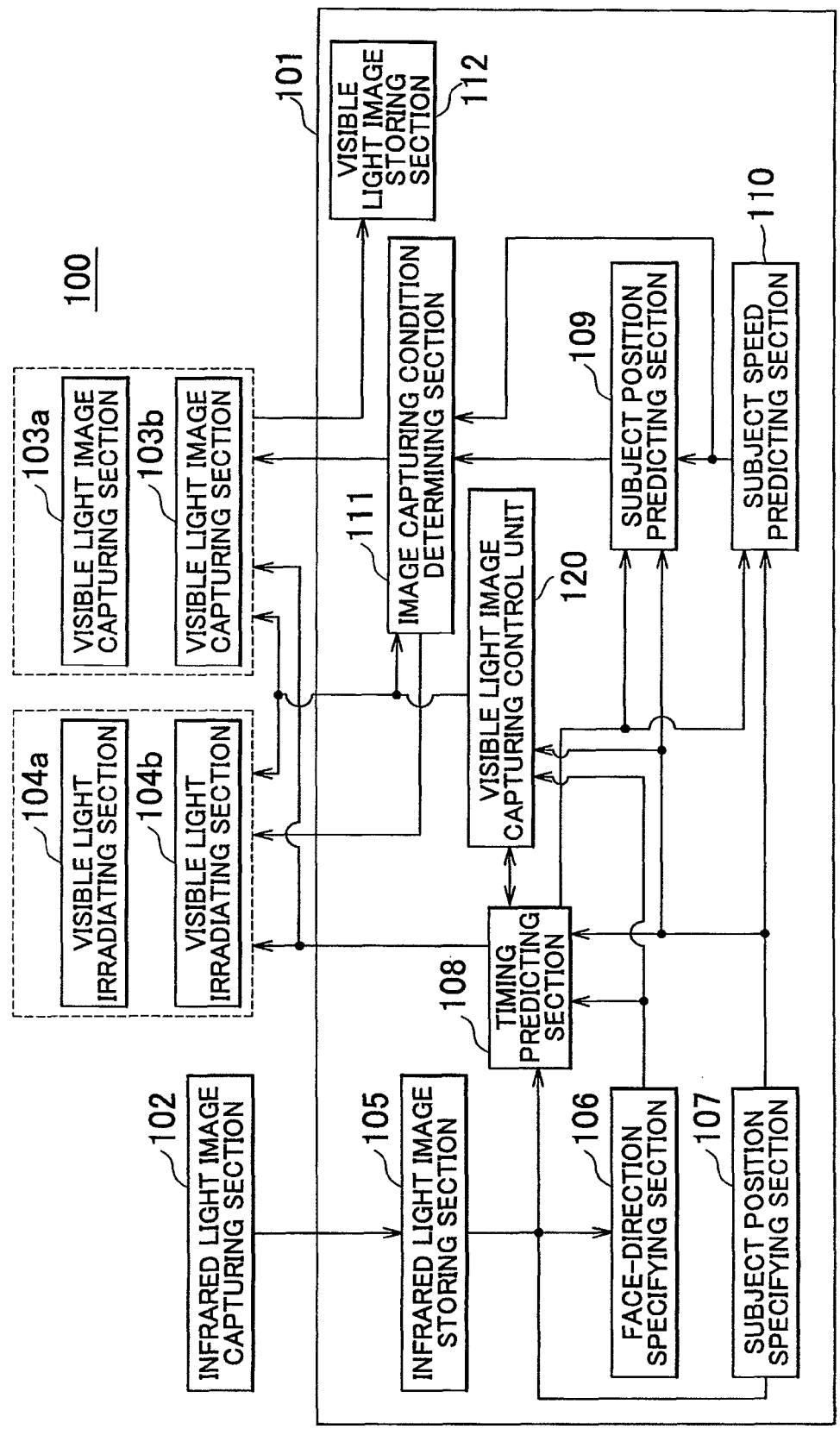
FIG. 2 shows one example of a block configuration diagram of a control section 101.

FIG. 2 shows one example of a block configuration diagram of a control section 101. The control section 101 includes an infrared light image storing section 105, a face-direction specifying section 106, a subject position specifying section 107, a timing predicting section 108, a subject position predicting section 109, a subject speed predicting section 110, an image capturing condition determining section 111, a visible light image capturing control unit 120, and a visible light image storing section 112.

The infrared light image storing section 105 stores the infrared light image captured by the infrared light image capturing section 102. The face-direction specifying section 106 specifies the direction of the face of a person, from the image content of the infrared light image stored in the infrared light image storing section 105. For example, the face-direction specifying section 106 detects the direction of the face of a person in an infrared light image, by means of pattern matching between the form of the object included in the infrared light image and a predetermined form of a person's face for each face direction, or the like. Note that the face-direction specifying section 106 may detect the position of the face of a person, based on the temperature distribution included in the image content of the infrared light image. The face-direction specifying section 106 may further specify the face direction, from the detected position of the face of the person based on the temperature distribution.

The subject position specifying section 107 specifies the position of the subject, from the image content of the infrared light image stored in the infrared light image storing section 105. For example, the subject position specifying section 107 detects the position of the subject in the infrared light image, by means of pattern matching between the form of the object included in the infrared light image and the form of the predetermined subject, or the like. Note that the subject position specifying section 107 detects the position of the subject, based on the temperature distribution included in the image content of the infrared light image. Then the subject position specifying section 107 specifies the position of the subject in the monitor region, from the position of the detected subject and the position in which the infrared light image capturing section 102 is installed.

The timing predicting section 108 detects a subject included in the image content, based on the image content of a plurality of successive infrared light images stored in the infrared light image storing section 105. Then the timing predicting section 108 predicts the timing at which the subject matches the predetermined condition. For example, the timing predicting section 108 predicts the timing at which the direction of the subject's face is in a predetermined direction, from the direction of the subject's face in each of the plurality of infrared light images specified by the face-direction specifying section 106. In addition, the timing predicting section 108 predicts the timing at which the position of the subject reaches a predetermined position, from each position of the subject in the plurality of infrared light images, specified by the subject position specifying section 107. Then the timing predicting section 108 transmits the predicted timing to the visible light image capturing section 103 and the visible light irradiating section 104.

Note that the condition to be matched in advance may also be a condition that the subject reaches a critical position at which a safe or the like is installed, or a condition that the subject reaches a position at which visible light is irradiated by the visible light irradiating section 104, as well as the condition that the direction of the person's face is in the direction opposite to the visible light image capturing section 103, and the condition that the subject reaches a position at which the image thereof can be captured by the visible light image capturing section 103.

The subject position predicting section 109 predicts a position of a subject at the timing predicted by the timing predicting section 108, based on each position, in the monitor region, of the subject in a plurality of times specified by the subject position specifying section 107. The subject speed predicting section 110 predicts the speed of the subject at the timing predicted by the timing predicting section 108, based on the position, in the monitor region, of the subject in a plurality of times specified by the subject position specifying section 107. Note that the subject speed predicting section 110 may predict the speed or the accelerated velocity of the subject.

The image capturing condition determining section 111 determines the image capturing condition during the image capturing of the visible light image capturing section 103, based on the position, the speed, or the accelerated velocity of the subject at the predicted timing by the timing predicting section 108. In addition, the image capturing condition determining section 111 determines the brightness of the monitor region at the timing predicted by the timing predicting section 108, thereby determining whether to cause the visible light irradiating section 104 to irradiate visible light or not.

The visible light image capturing control unit 120 selects a visible light image capturing section 103 to capture a visible light image, and a visible light irradiating section 104 to irradiate visible light, based on the face direction specified by the face-direction specifying section 106 and the position of the subject specified by the subject position specifying section 107. Then the visible light image capturing control unit 120 supplies the information specifying the selected visible light image capturing section 103 to the timing predicting section 108. The timing predicting section 108 predicts the timing at which the visible light image capturing section 103 specified by the information supplied by the visible light image capturing control unit 120 performs image capturing, in the aforementioned method. In addition, the visible light image capturing control unit 120 supplies the information specifying the selected visible light image capturing section 103 and the information specifying the selected visible light irradiating section 104, to the image capturing condition determining section 111. The timing predicting section 108 determines the image capturing condition of the visible light image capturing section 103 specified by the information supplied from the visible light image capturing control unit 120, in the aforementioned method. In addition, the timing predicting section 108 may determine whether to cause, to irradiate visible light, the visible light irradiating section 104 specified by the information supplied from the visible light image capturing control unit 120. Note that the function and the operation of the visible light image capturing control unit 120 are detailed in greater detail with reference to FIG. 3.

Note that the infrared light image capturing section 102 may include an infrared light irradiating section (not illustrated) for irradiating infrared light to a monitor region. The infrared light image capturing section 102 captures a reflected image of the infrared light irradiated by the infrared light irradiating section, as an infrared light image. The infrared light image resulting from capturing the reflected image will be an image in which a portion that favorably reflects the infrared light (e.g. eyes) is emphasized, and so will be a preferable image for detecting a subject included in the infrared light image and for specifying the direction of a person's face.

In addition, the control section 101 may further include a monitor region temperature memorizing section (not illustrated) that memorizes, in advance, a position of an object existing in a fixed manner in a monitor region, and the temperature generated by the object. The timing predicting section 108, the face-direction specifying section 106, and the subject position specifying section 107 compare the temperature and position of the object included in the image content of the infrared light image captured by the infrared light image capturing section 102, to the temperature of the object and the position of the object memorized in the monitor region temperature memorizing section. The timing predicting section 108, the face-direction specifying section 106, and the subject position specifying section 107 specify whether the object included in the infrared light image is the object fixed in the monitor region or not, from the comparison result. The timing predicting section 108, the face-direction specifying section 106, and the subject position specifying section 107 may detect, as a subject, the object specified as not being a fixed object from among the objects included in the infrared light image, and specify the position of the subject, from the relative position between the fixed object and the subject.

Figure 3:
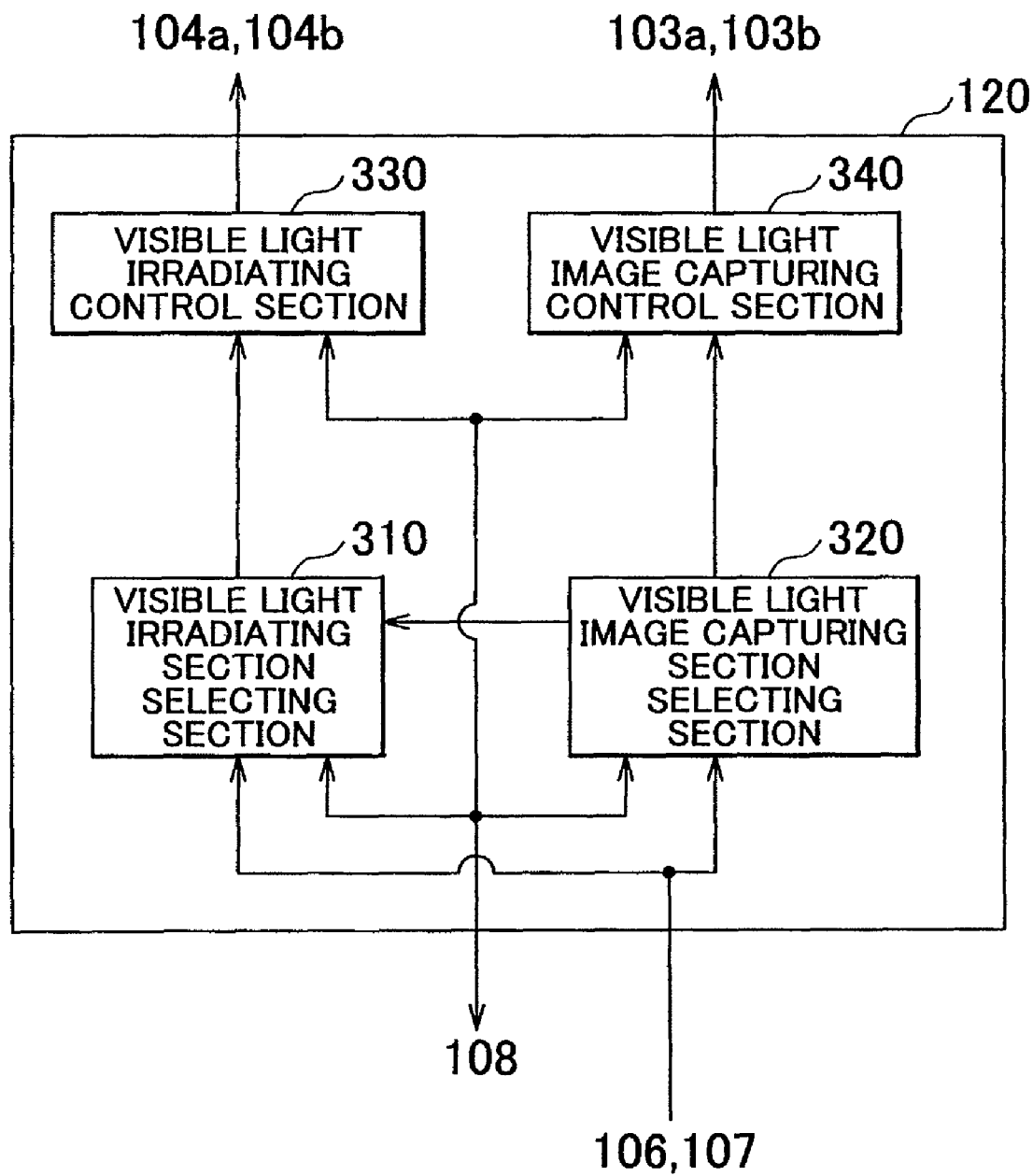
FIG. 3 shows one example of a block configuration of a visible light image capturing control unit 120.

FIG. 3 shows one example of a block configuration of a visible light image capturing control unit 120. The visible light irradiating section selecting section 310 selects, from the plurality of visible light irradiating sections 104, a visible light irradiating section 104 irradiating visible light at timing predicted by the timing predicting section 108, based on the timing at which each of the plurality of infrared light images is captured and the image content of the plurality of infrared light images. To be specific, the visible light irradiating section selecting section 310 selects, from among a plurality of visible light irradiating sections 104, a visible light irradiating section 104 irradiating visible light at timing predicted by the timing predicting section 108, based on a predetermined subject motion specified based on the timing at which each of the plurality of infrared light images is captured and the image content of the plurality of infrared light images. For example, the visible light irradiating section selecting section 310 selects, from among a plurality of visible light irradiating sections 104, a visible light irradiating section 104 whose at least one of the positional relation with respect to a position of a predetermined subject and the relation between the direction of a predetermined subject and an irradiation direction of visible light is predicted to match a predetermined condition, based on the motion of the predetermined subject. Then the visible light irradiating control section 330 controls the visible light irradiating section 104 selected by the visible light irradiating section selecting section 310 to irradiate visible light at the timing predicted by the timing predicting section 108.

The visible light image capturing section selecting section 320 selects, from among a plurality of visible light image capturing sections 103, a visible light image capturing section 103 capturing a visible light image, based on the timing at which each of the plurality of infrared light images is captured and the image content of the plurality of infrared light images. Specifically, the visible light image capturing section selecting section 320 selects, from among a plurality of visible light image capturing sections 103, a visible light image capturing section 103 for capturing a visible light image, based on the timing at which each of the plurality of infrared light images is captured and the image content of the plurality of infrared light images. For example, the visible light image capturing section selecting section 320 selects, from among a plurality of visible light image capturing sections 103, a visible light image capturing section 103 whose at least one of the positional relation with respect to a position of a predetermined subject and the relation between the direction of a predetermined subject and an image capturing direction is predicted to match a predetermined condition, based on the motion of the predetermined subject, as a visible light image capturing section 103 for capturing a visible light image.

The visible light image capturing control section 340 controls the visible light image capturing section 103 selected by the visible light image capturing section selecting section 320 to capture a visible light image at timing predicted by the timing predicting section 108. Note that the timing predicting section 108 predicts timing at which a predetermined subject matches a predetermined condition, based on the motion of the predetermined subject. To be concrete, the timing predicting section 108 predicts timing at which at least one of the positional relation between the visible light image capturing section 103 selected by the visible light image capturing section selecting section 320 and the position of the predetermined subject and relation between the image capturing direction of the visible light image capturing section 103 selected by the visible light image capturing section selecting section 320 and the predetermined subject direction matches a predetermined condition, based on the motion of the predetermined subject.

Figure 4:
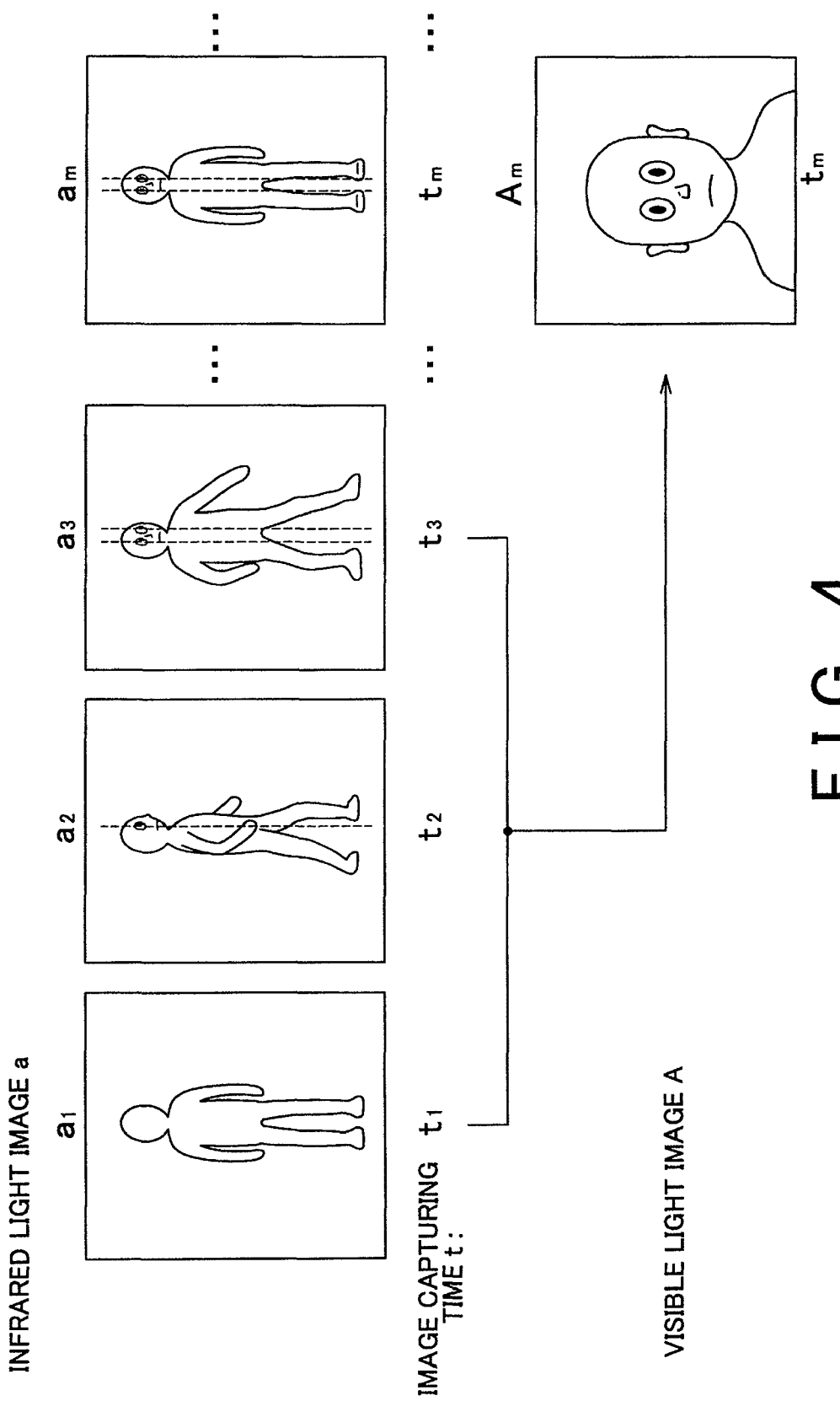
FIG. 4 shows one example in which a face-direction specifying section 106 specifies the direction of the face of a person included in an infrared light image.

FIG. 4 shows one example of a method by which a face-direction specifying section 106 specifies the direction of the face of a person included in an infrared light image. The face-direction specifying section 106 specifies the direction of a face of a person, from an image of the face portion of a person included in an infrared light image $a_1$ captured at the time $t_1$. The face-direction specifying section 106 obtains the temperature distribution generated by the face portion of a person included in the infrared light image. The face-direction specifying section 106 specifies the position of the eyes from the obtained temperature distribution. The face-direction specifying section 106 specifies the direction of the person's face, by measuring the bias level of the eyes from the specified position of the eyes. The face-direction specifying section 106 cannot detect the position of the eyes from the infrared light image $a_1$ captured at the time $t_1$, and so specifies that the person is facing backward with respect to the infrared light image capturing section 102. The face-direction specifying section 106 detects one point of the position of the eyes from the infrared light image $a_2$ captured at the time $t_2$, thereby specifying that the person is facing towards the side with respect to the infrared light image capturing section 102, from the point of the position of the eyes and the bias level of the face portion. The face-direction specifying section 106 detects two points of the positions of the eyes from the infrared light image $a_3$ captured at the time $t_3$, thereby specifying that the person is facing to a diagonally forward direction with respect to the infrared light image capturing section 102, from the two points of the positions of the eyes and the bias level of the face portion. In this way, the face-direction specifying section 106 specifies the direction of the face of the person with respect to the infrared light image capturing section 102.

The timing predicting section 108 predicts the timing $t_m$ at which the person will oppose the visible light image capturing section 103, by calculating the rotation speed of the person, from each position of eyes specified by the face-direction specifying section 106, each time $t_1$-$t_3$ at which each of the infrared light images $a_1$-$a_4$ is captured, and the position at which the visible light image capturing section 103 is installed. The timing predicting section 108 obtains a visible light image $A_m$ at which the visible light image capturing section 103 is predicted to capture the front side of the face of the person, by causing the visible light image capturing section 103 to perform image capturing at the timing $t_m$.

Note that the face-direction specifying section 106 may specify the direction of the face, by obtaining the position of the nose, the ears, or the mouth, from the temperature distribution of the face portion of the person. Moreover, the timing predicted by the timing predicting section 108 is not limited to the timing at which the person opposes the visible light image capturing section 103, and may alternatively be the timing at which the person faces a certain direction, or the timing at which the person faces to the side with respect to the visible light image capturing section 103, for example. Furthermore, the face-direction specifying section 106 specifies the direction of the face of the person included in each of the successive infrared light images $a_1$-$a_3$, however it is sufficient if the face-direction specifying section 106 specifies the direction of the face of the person included in at least two successive infrared light images. For the timing predicting section 108 to be able to predict more exact timing, the face-direction specifying section 106 should preferably specify each of the direction of the face of the person with respect to the visible light image capturing section 103 included in successive infrared light images more in number.

Figure 5:
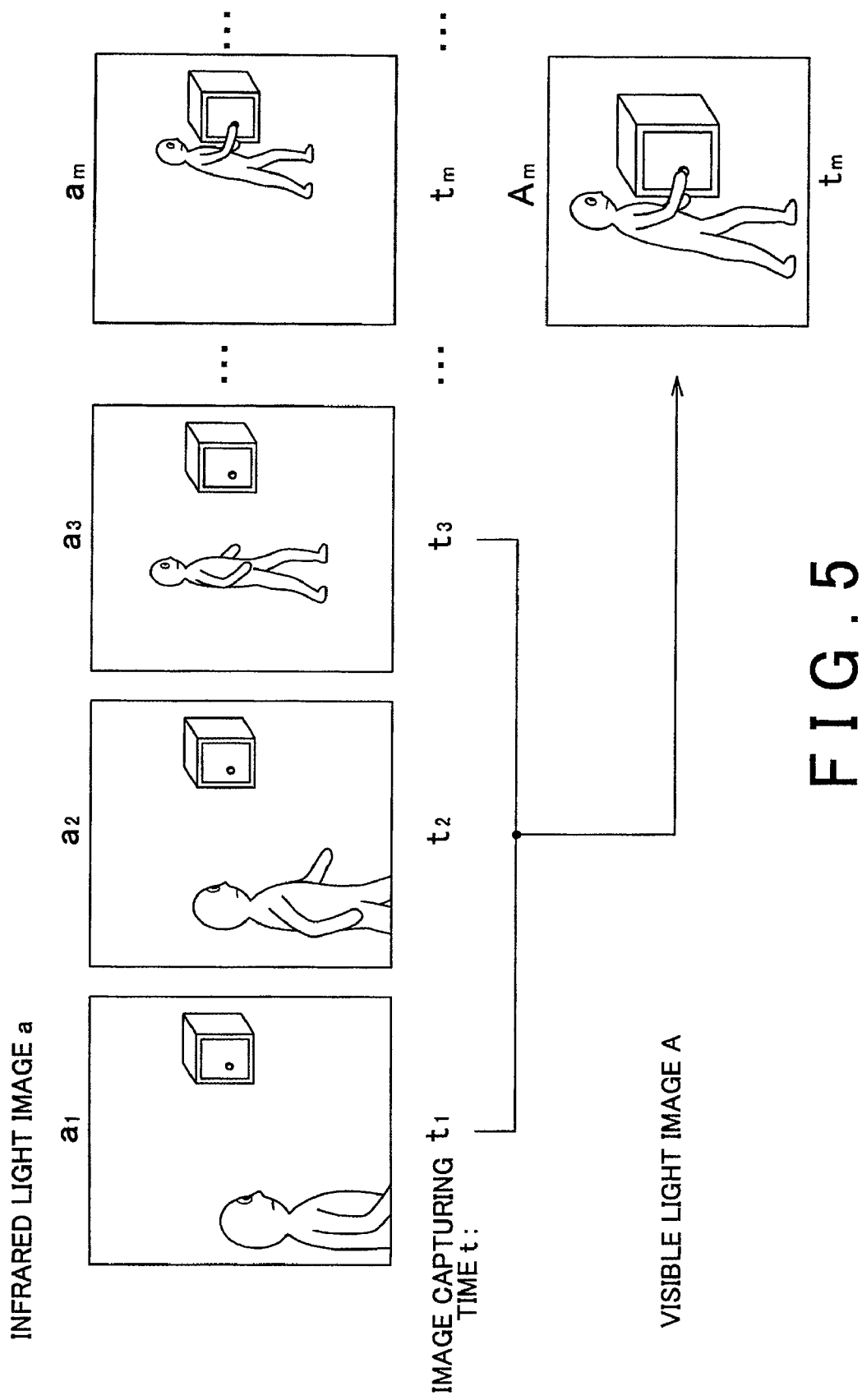
FIG. 5 shows one example in which a subject position specifying section 107 specifies a location, in a monitor region, of a subject included in an infrared light image.

FIG. 5 shows one example in which a subject position specifying section 107 specifies a location, in a monitor region, of a subject included in an infrared light image. The subject position specifying section 107 obtains the temperature distribution included in an infrared light image. The subject position specifying section 107 detects an object included in the infrared light image, from the obtained temperature distribution. The subject position specifying section 107 specifies the subject from the detected object. The subject position specifying section 107 obtains the installed position of the infrared light image capturing section 102 having captured the image of the subject is installed. The subject position specifying section 107 specifies the position of the subject within the monitor region, from the installed position of the infrared light image capturing section 102, and the position of the detected object included in the infrared light image and the position of the specified subject.

The subject position specifying section 107 obtains each temperature distribution included in each infrared light image $a_1$-$a_3$ captured at each of the successive times $t_1$-$t_3$, thereby obtaining the position of the subject in the infrared light image. The subject position specifying section 107 further obtain the installed position of the infrared light image capturing section 102 having captured the image of the subject. The subject position specifying section 107 specifies the position, in the monitor region, of the subject included in each of the infrared light images $a_1$-$a_3$, from the position of the subject in the infrared light image and the installed position of the infrared light image capturing section 102 having captured the image of the subject. The timing predicting section 108 calculates the speed at which the subject moves, from each position, in the monitor region, of the subject specified by the subject position specifying section 107 and from each of the times $t_1$-$t_3$ at which the infrared light images $a_1$-$a_3$ were captured, thereby predicting the timing $t_m$ at which the subject reaches a certain position. The timing predicting section 108 obtains the visible light image $A_m$ that includes the position at which the subject is predicted to be existing, by causing the visible light image capturing section 103 to perform image capturing at the timing $t_m$.

Note that the subject position specifying section 107 may detect the temperature distribution of the portion such as eyes, nose, ears, or mouth from the temperature distribution, thereby specifying a subject. In addition, the subject position specifying section 107 may obtain the position of the safe, etc, besides the position of the subject, from the image content of the infrared light image, so as to obtain the position, in the monitor region, of the subject, relative to the position of the subject, the position of the safe, and the installed position of the infrared light image capturing section 102. Furthermore, the infrared light images used by the subject position specifying section 107 in specifying the position of the subject are designated as $a_1$-$a_3$ which are successive, however it is sufficient if at least two successive infrared light images are used in specifying the position of the subject included therein. It is preferable that the subject position specifying section 107 specify the position of the subject included in more number of successive infrared light images, for the timing predicting section 108 to be able to perform more accurate prediction.

Figure 6:
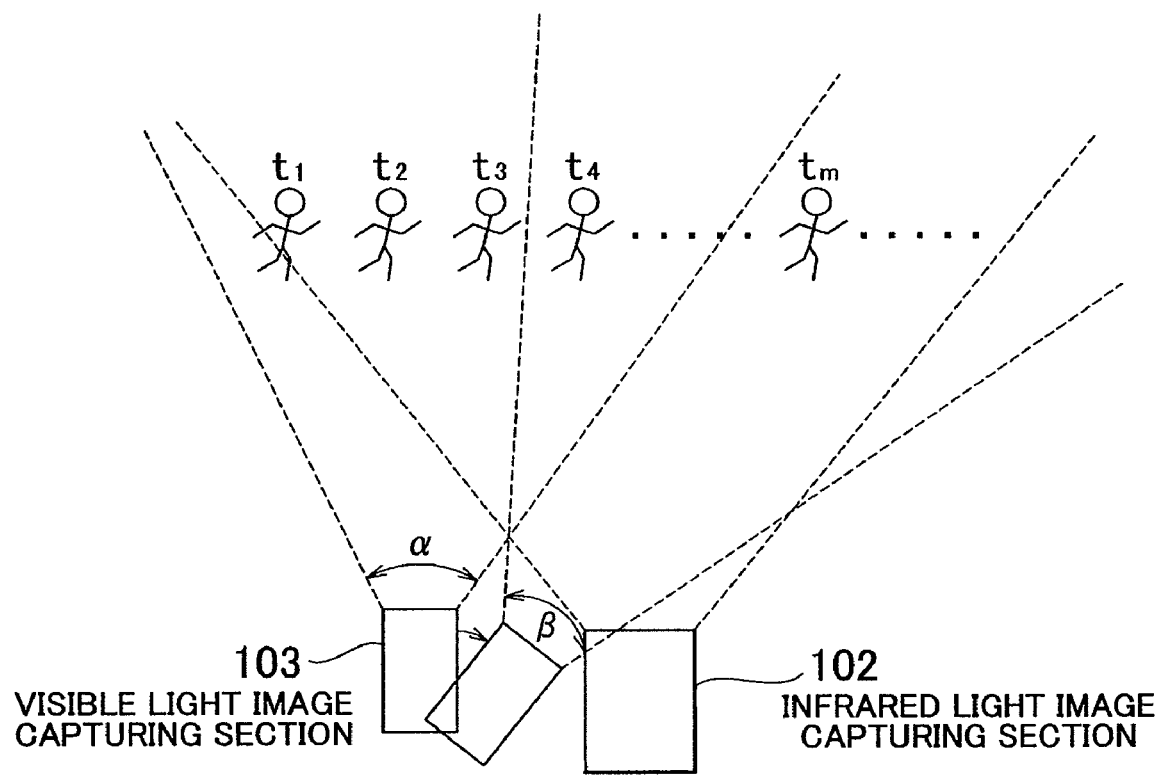
FIG. 6 shows one example in which an image capturing condition determining section 111 determines an image capturing direction of a visible light image capturing section 103.

FIG. 6 shows one example of a method by which an image capturing condition determining section 111 determines an image capturing direction of a visible light image capturing section 103. The subject position predicting section 109 obtains each position of the subject specified from the plurality of successive infrared light images $a_1$-$a_4$ and the times $t_1$-$t_4$ at which the infrared light images $a_1$-$a_4$ are captured. In addition, the subject position predicting section 109 obtains the timing $t_m$ at which the timing predicting section 108 causes the visible light image capturing section 103 to perform image capturing. The subject position predicting section 109 predicts the position, in the monitor region, of the subject at the timing $t_m$, from each position of the subject in the monitor region, each time at which the infrared light image is captured, and the timing $t_m$. The image capturing condition determining section 111 obtains the predicted position, in the monitor region, of the subject predicted by the subject position predicting section 109, and the current image capturing direction and field angle of the visible light image capturing section 103. The image capturing condition determining section 111 determines the image capturing direction of the visible light image capturing section 103, as the direction in which the visible light image capturing section 103 is able to capture the image of the subject at the timing $t_m$. In other words, the image capturing condition determining section 111 determines the image capturing direction of the visible light image capturing section 103, from the image capturing region α to the image capturing region β, so as to enable the image of the subject to be captured at the timing $t_m$.

Note that the image capturing condition determining section 111 may further obtain the speed and the accelerated velocity of the motion of the subject predicted by the subject speed predicting section 110, so as to determine the image capturing direction of the visible light image capturing section 103. In this case, the subject position predicting section 109 predicts the position of the subject, further from the speed and the accelerated velocity of the subject predicted at the timing $t_m$ obtained from the subject speed predicting section 110. The image capturing condition determining section 111 determines the image capturing direction of the visible light image capturing section 103 to be the direction in which the image of the predicted position of the subject can be captured.

Figure 7:
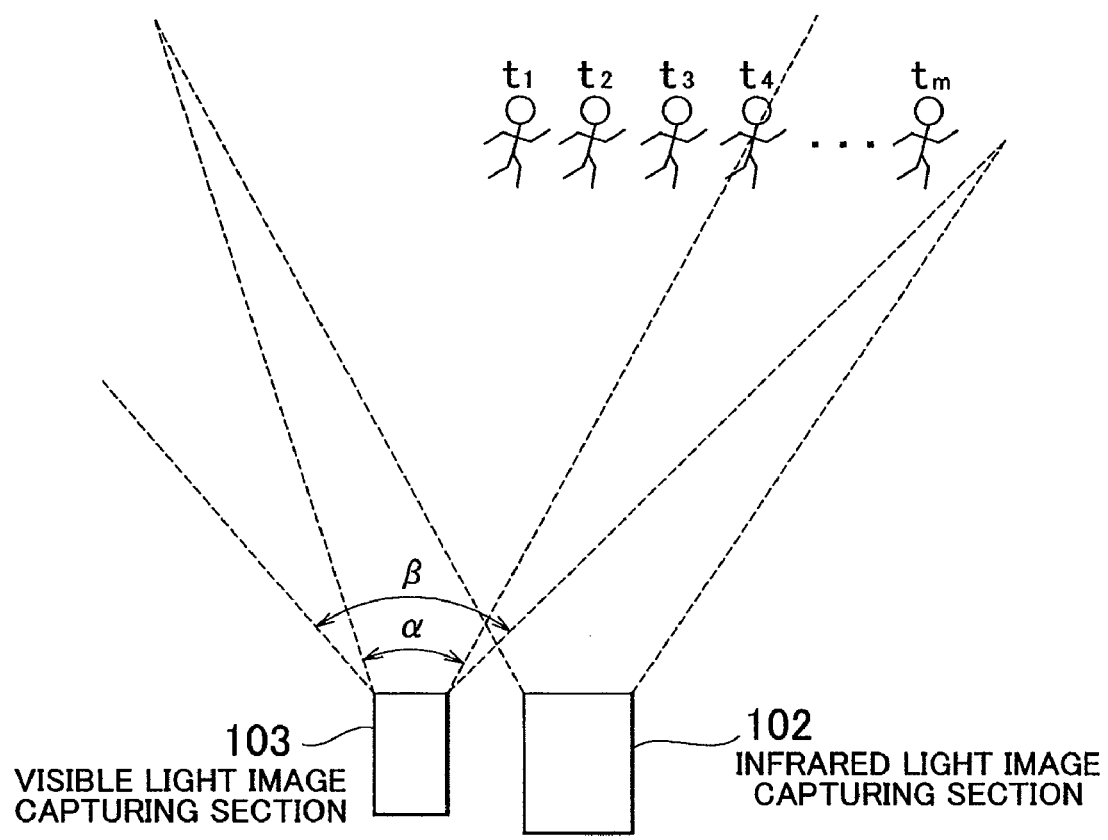
FIG. 7 shows one example in which the image capturing condition determining section 111 determines the field angle of the visible light image capturing section 103.

FIG. 7 shows one example of a method by which the image capturing condition determining section 111 determines the field angle of the visible light image capturing section 103. The subject position predicting section 109 obtains each position of the subject specified by the plurality of successive infrared light images $a_1$-$a_4$ and the times $t_1$-$t_4$ at which the infrared light images $a_1$-$a_4$ are respectively captured. In addition, the subject position predicting section 109 obtains the timing $t_m$ at which the timing predicting section 108 causes the visible light image capturing section 103 to perform image capturing. The subject position predicting section 109 predicts the position, in the monitor region, of the subject at the timing $t_m$, from each position of the subject in the monitor region, each time at which the infrared light image is captured, and the timing $t_m$. The image capturing condition determining section 111 obtains the predicted position, in the monitor region, of the subject predicted by the subject position predicting section 109, and the current image capturing direction and field angle of the visible light image capturing section 103. The image capturing condition determining section 111 determines the field angle of the visible light image capturing section 103, as the field angle in which the visible light image capturing section 103 is able to capture the image of the subject at the timing $t_m$. In other words, the image capturing condition determining section 111 determines the field angle of the visible light image capturing section 103, from the image capturing region α to the image capturing region β, so as to enable the image of the subject to be captured at the timing $t_m$.

Note that the image capturing condition determining section 111 may further obtain the change in the speed of the motion of the subject predicted by the subject speed predicting section 110, so as to determine the field angle of the visible light image capturing section 103. In this case, the subject position predicting section 109 predicts the position of the subject, further from the speed and the accelerated velocity of the subject predicted at the timing $t_m$ obtained from the subject speed predicting section 110. The image capturing condition determining section 111 determines the field angle of the visible light image capturing section 103 to be the field angle in which the image of the predicted position of the subject can be captured. In addition, although the present example has dealt with a case where the field angle is widened, the image capturing condition determining section 111 may also determine to narrow the field angle to capture the subject in the entire frame.

Figure 8:
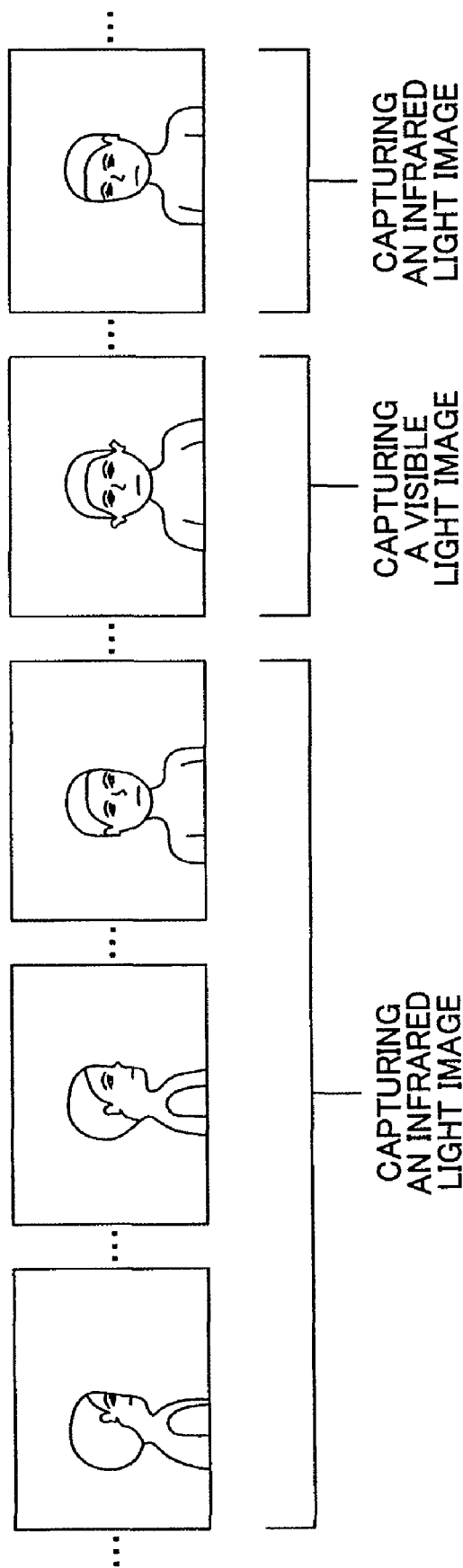
FIG. 8 shows one example of an image captured by the infrared light image capturing section 102 and the visible light image capturing section 103.

FIG. 8 shows one example of an image captured by the infrared light image capturing section 102 and the visible light image capturing section 103. In the present example, the infrared light image capturing section 102 and the visible light image capturing section 103 are formed as an integral configuration, and are installed in the same case. Since being installed in the same case, the infrared light image capturing section 102 and the visible light image capturing section 103 may stop taking in the infrared light image by means of an image capturing device for infrared light or a plurality of pixels that subject the infrared light to photoelectric conversion. The present example deals with a case where the image capturing system 100 specifies the direction of a person's face, and the infrared light image capturing section 102 and the visible light image capturing section 103 capture both of an infrared light image and a visible light image.

The infrared light image capturing section 102 captures an infrared light image of the monitor region, by utilizing an image capturing device for infrared light or a plurality of pixels that subject the infrared light to photoelectric conversion. The visible light image capturing section 103 receives the timing at which the image of the visible light is captured, and the determined image capturing condition, from the control section 101. The infrared light image capturing section 102 and the visible light image capturing section 103 stop taking in of the infrared light image by means of an image capturing device for infrared light or a plurality of pixels that subject the infrared light to photoelectric conversion, in concordance with the timing at which the visible light is captured, and starts taking in of the visible light image by means of an image capturing device for visible light or a plurality of pixels that subject the visible light to photoelectric conversion. In addition, the infrared light image capturing section 102 and the visible light image capturing section 103 perform operations such as changing the image capturing direction and changing the field angle, based on the image capturing condition. The visible light image capturing section 103 captures a visible light image at the received timing. After capturing the visible light image, the infrared light image capturing section 102 and the visible light image capturing section 103 stop taking in of the visible light image by means of an image capturing device for visible light or a plurality of pixels that subject the visible light to photoelectric conversion. The infrared light image capturing section 102 and the visible light image capturing section 103 return the image capturing direction, the field angle, etc. having been changed based on the image capturing condition, to the state before the change, and re-start taking in the infrared light by means of an image capturing device for infrared light or a plurality of pixels that subject the infrared light to photoelectric conversion, for capturing an infrared light image.

Figure 9:
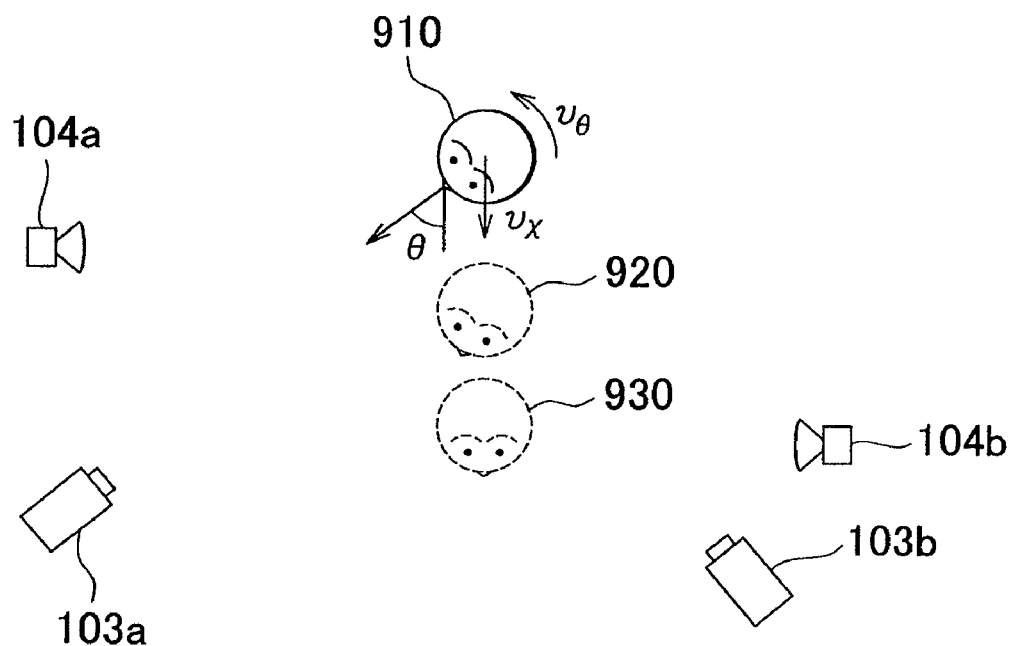
FIG. 9 shows one example of a positional relation between the visible light image capturing section 103 and a visible light irradiating section 104, and a person.

FIG. 9 shows one example of a positional relation between a person (one example of a subject) and the visible light image capturing section 103 and a visible light irradiating section 104. The visible light image capturing section selecting section 320 calculates the motion speed vx from each position, in the infrared light image, of a person represented as a reference numeral 910 specified by the subject position specifying section 107. In addition, the visible light image capturing section selecting section 320 calculates the rotation speed vθ of a person's face, from the angle θ indicating the direction of the face specified in each infrared light image by the face direction specifying section 106.

The visible light image capturing section selecting section 320 selects the visible light image capturing section 103 capable of capturing the image of the face within a predetermined time from a direction appropriate for recognizing a person, based on the motion speed vx and the rotation speed vθ having been calculated. Note that the direction appropriate for recognizing a person may be a direction in which the image of a face can be captured in a diagonal direction. For example, the direction appropriate for recognizing a person may be a direction forming an angle exceeding a predetermined value with respect to the front direction to the face. For example, the visible light image capturing section selecting section 320 my select the visible light image capturing section 103a capable of capturing an image of a person's face from a diagonally right direction. Then the visible light image capturing section selecting section 320 supplies information specifying the visible light image capturing section 103a to the timing predicting section 108. The timing predicting section 108 predicts timing at which the person moves to the position indicated by the reference numeral 920, based on the current motion speed vx, the current person's position, and the rotation speed vθ of the person's face. To be specific, the timing predicting section 108 predicts timing at which the person moves to the position at which the image capturing direction of the visible light image capturing section 103a forms a predetermined angle with respect to the direction of the person's face and at which the distance between the visible light image capturing section 103a and the person becomes smaller than a predetermined value.

In addition, the visible light irradiating section selecting section 310 selects a visible light irradiating section 104 that is to irradiate visible light at timing predicted by the timing predicting section 108. The visible light irradiating section selecting section 310 selects a visible light irradiating section 104a whose visible light irradiating direction forms a predetermined angle with respect to the direction of the person's face at the timing and that the distance thereof with the person is smaller than a predetermined value.

In addition, using the same method as stated above, the visible light image capturing section selecting section 320 selects a visible light image capturing section 103b capable of capturing an image of a person from a diagonally left direction. The timing predicting section 108 predicts the timing reaching the position at which the visible light image capturing section 103b is able to capture the image of a person from the diagonally left direction (e.g. the position indicated by the reference numeral 930). Then the visible light irradiating section selecting section 310 selects a visible light irradiating section 104b as the visible light irradiating section 104 to irradiate visible light, as in the same method as stated above.

FIG. 10 shows one example of a flowchart showing an operation of the image capturing system 100. The infrared light image capturing section 102 is constantly capturing the infrared light image in the monitor region (Step 201). The infrared light image capturing section 102 transmits the captured infrared light image to the control section 101. The control section 101 receives the transmitted infrared light image and stores the same to the infrared light image storing section 105. The subject position specifying section 107 determines whether there exists a subject in the monitor region, from the image content of the plurality of successive infrared light images stored in the infrared light image storing section 105. When having detected a subject, the subject position specifying section 107 specifies the position of the subject (Step 202). The subject position specifying section 107 specifies each position of the subject existing in the monitor region, from the image content of the plurality of successive infrared light images. In addition, the subject position specifying section 107 obtains each time at which the plurality of successive infrared light images were captured. The subject position specifying section 107 transmits each position, in the monitor region, of the specified subject and each obtained time, to the timing predicting section 108. The face-direction specifying section 106 specifies each face portion of the specified person from the image content of the plurality of successive infrared light images, and specifies each direction of the person's face from the temperature distribution of the face portion (Step 203). In addition, the face-direction specifying section 106 obtains each time at which the plurality of successive infrared light images have been obtained. The face-direction specifying section 106 transmits each direction of the specified person's face and each obtained time, to the timing predicting section 108.

The timing predicting section 108 calculates the speed of the motion of the subject, from each position of the subject in the monitor region and each time transmitted from the subject position specifying section 107, thereby predicting the timing at which the subject reaches the position that matches a predetermined condition (Step 204). In addition, the timing predicting section 108 calculates the rotation speed of the head of the person, from each face direction of the person and each time transmitted form the face-direction specifying section 106, thereby predicting the timing at which the face direction matches a predetermined condition (Step 205).

The visible light image capturing section selecting section 320 selects a visible light image capturing section 103 to capture a visible light image (Step 206). For example, the visible light image capturing section selecting section 320 selects a visible light image capturing section 103 to capture a visible light image, using the method illustrated in FIG. 9. The timing predicting section 108 predicts the timing at which the visible light image capturing section 103 is caused to perform image capturing, from the timing of the visible light image capturing section 103 regarding the predicted subject position, and the timing of the visible light image capturing section regarding the person's face direction (Step 207). During this operation, the timing predicting section 108 predicts the timing at which the visible light image capturing section 103 selected in S206 is caused to perform image capturing.

The image capturing condition determining section 111 determines whether an image capturing condition is set for image capturing of a visible light image by the visible light image capturing section 103 (Step 208). The image capturing condition determining section 111 determines whether to determine an image capturing condition, according to whether a predicted value regarding a subject has been transmitted to the subject position predicting section 109 from the subject position predicting section 109 or the subject speed predicting section 110. The image capturing condition determining section 111 determines the current state of the visible light image capturing section 103 to be a default setting of the visible light image capturing section 103, if the predicted value regarding the subject has not been transmitted from the subject position predicting section 109 or the subject speed predicting section 110 (Step 218). The timing predicting section 108 transmits the predicted timing to the visible light image capturing section 103. The visible light image capturing section 103 captures the image of the monitor region, by receiving an image capturing signal (Step 212).

When determining to decide an image capturing condition for the image capturing of a visible light image of the visible light image capturing section 103, the image capturing condition determining section 111 determines an image capturing condition for the visible light image capturing section 103 (Step 209). From each subject's position in the monitor region specified by the subject position specifying section 107, each time obtained by the subject position specifying section 107, and the timing predicted by the timing predicting section 108, the subject position predicting section 109 predicts the position of the subject existing in the monitor region at the timing. In addition, from each subject's position specified by the subject position specifying section 107, each time obtained by the subject position specifying section 107, and the timing predicted by the timing predicting section 108, the subject speed predicting section 110 predicts the speed of the motion of the subject existing in the monitor region and the change in speed of the motion of the subject at the timing. The image capturing condition determining section 111 obtains at least the predicted subject's position, the predicted speed of the motion of the subject, or the change amount of the speed of the motion of the subject, so as to determine the image capturing condition of the visible light image capturing section 103. The image capturing condition determining section 111 determines at least the focal position of the visible light image capturing section 103, the image capturing direction of the visible light image capturing section 103, the field angle adopted for image capturing of the visible light image capturing section 103, the frame rate used in image capturing of the visible light image capturing section 103, and the resolution used in image capturing of the visible light image capturing section 103, as the image capturing condition.

The image capturing condition determining section 111 determines the focal position of the visible light image capturing section 103, at least based on the predicted subject's position obtained from subject position predicting section 109 and the installed position of the visible light image capturing section 103. In addition, the image capturing condition determining section 111 determines the image capturing direction of the visible light image capturing section 103, at least based on the predicted subject's position obtained from subject position predicting section 109 and the installed position of the visible light image capturing section 103. The image capturing condition determining section 111 determines the field angle adopted for image capturing of the visible light image capturing section 103, at least based on he predicted subject's position obtained by the subject position predicting section 109 and the installed position of the visible light image capturing section 103.

When the visible light image capturing section 105 captures a motion image constituting image, the image capturing condition determining section 111, in determining the frame rate used in image capturing of the visible light image capturing section 103, determines a frame rate optimal for image capturing by the visible light image capturing section 103, from the speed of the motion of the subject or the accelerated velocity of the subject obtained from the subject speed predicting section 110 and the position of the subject obtained from the subject position predicting section 109. When the predicted motion speed of the subject is faster at the predicted position, the image capturing condition determining section 111 sets a larger frame rate used in image capturing by the visible light image capturing section 103, thereby capturing the image of the action of the subject with a larger number of frames. According to this, even when the motion of the subject is fast, it is possible to capture the image of a fine motion of the subject. Conversely, when the predicted motion speed of the subject is slower at the predicted position, the image capturing condition determining section 111 sets a smaller frame rate used in image capturing by the visible light image capturing section 103, thereby capturing the image of the motion of the subject with a smaller number of frames. According to this, when the motion of the subject is slow, it becomes possible to restrain the data amount of the visible light image. Note that to prevent the frame rate from being too small, it is preferable to designate a certain threshold value for the frame rate, and to perform image capturing at a frame rate of the designated threshold value when the speed of the motion of the subject is a predetermined value or smaller.

The image capturing condition determining section 111 determines the resolution used in image capturing of the visible light image capturing section 103, using the predicted subject's position obtained from the subject position predicting section 109 and the installed position of the visible light image capturing section 103. The image capturing condition determining section 111 calculates the size of the subject whose image is to be captured, from the predicted subject's position and the installed position of the visible light image capturing section 103. The image capturing condition determining section 111 determines to enlarge the resolution of the subject, when the calculated size of the subject is determined to be smaller. Resolution enlargement is realized by zooming the predicted position using an optical lens, or by increasing the number of the light receiving elements of the visible light image capturing section 103. Increase in the number of the light receiving elements is explained as follows. When the position of the subject in the monitor region is sufficiently near relative to the installed position of the visible light image capturing section 103, i.e. when the size of the subject is sufficiently large, the visible light image capturing section 103 performs image capturing by interpolating the number of light receiving elements for reducing the data amount. As opposed to this, when the position of the subject in the monitor region is far from the installed position of the visible light image capturing section 103, i.e. when the size of the subject is small, the increase in the number of the light receiving elements is performed by using all the light receiving elements included in the visible light image capturing section 103 to capture the image of the subject, for the purpose of clarifying the image of the subject included in the captured visible light image.

When the visible light image capturing section 103 captures a motion image constituting image, and that when the visible light image capturing section 103 attempts to capture a visible light image where the distance between the visible light image capturing section 103 and the subject becomes farther or nearer, from the image capturing start, it is more effective to change the resolution. The visible light image capturing section 103 starts capturing the visible light image at the timing for executing the image capturing. The subject position predicting section 109 predicts the position of the subject thereafter, by the position of the subject in the monitor region specified by the subject position specifying section 107 and the predicted position of the subject in the monitor region at the timing predicted by the timing predicting section 108. The image capturing condition determining section 111 determines the change amount of the resolution from the position of the subject predicted by the subject position predicting section 109, and transmits the same to the visible light image capturing section 103. The visible light image capturing section 103 changes the resolution in accordance with the change amount of the resolution determined by the image capturing condition determining section 111, thereby capturing the motion image constituting image.

Note that for capturing the image of the subject with more appropriate resolution, the subject position predicting section 109 may further obtain the speed or accelerated velocity of the motion of the subject predicted by the subject speed predicting section 110, thereby predicting the position of the subject. In addition, when the direction of movement of the subject has changed or the like, it is possible to approach a further appropriate resolution by setting, to be finer, the conditions using which the timing predicting section 108 predicts the timing, so as to determine the change amount of the resolution used in image capturing of the image capturing condition determining section 111, to be finer.

The image capturing condition determining section 111 determines whether to cause the visible light irradiating section 104 to perform irradiation at the time of image capturing by the visible light image capturing section 103 (Step 210). The image capturing condition determining section 111 determines whether to cause the visible light irradiating section 104 to perform irradiation, by specifying the surrounding brightness from the light amount obtained from the light amount measuring section. The image capturing condition determining section 111 determines to cause the visible light irradiating section 104 to irradiate visible light, when determining that the surrounding brightness is not sufficient for image capturing by the visible light image capturing section 103.

The visible light irradiating section selecting section 310 selects a visible light irradiating section 104 to be caused to irradiate visible light, from a plurality of visible light irradiating sections 104 (Step 214). For example, the visible light irradiating section selecting section 310 selects a visible light irradiating section 104 to be caused to irradiate visible light using the method illustrated in FIG. 9. The timing predicting section 108 synchronizes visible light image capturing by the visible light image capturing section 103 and visible light irradiation by the visible light irradiating section 104, according to transmission of the same timing with respect to the visible light image capturing section 103 and the visible light irradiating section 104. The visible light irradiating section 104 irradiates visible light to the monitor region in synchronization with the image capturing by the visible light image capturing section 103 (Step 216).

Figure 11:
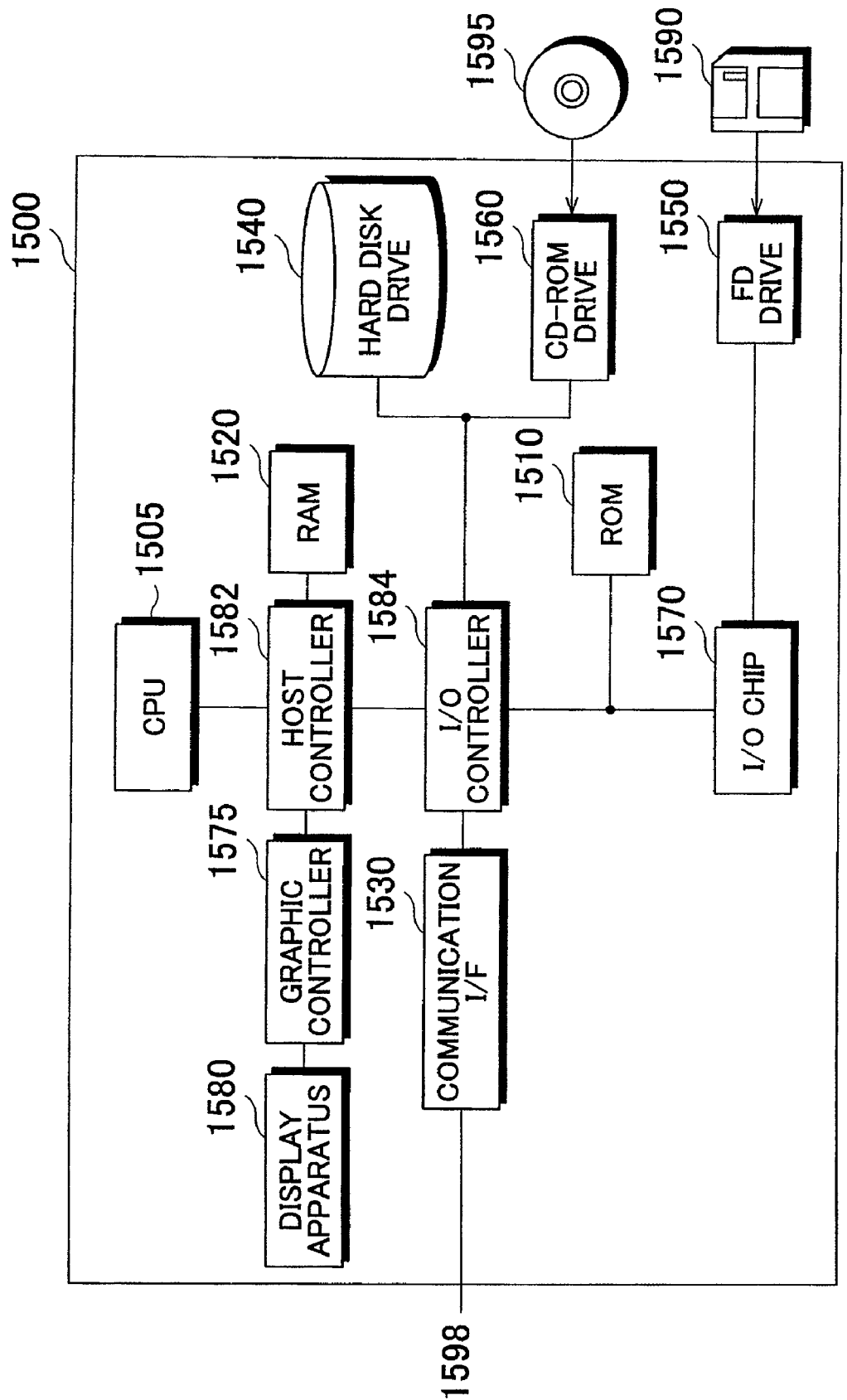
FIG. 11 shows one example of a hardware configuration of the control section 101.

FIG. 11 shows one example of a hardware configuration of the control section 101. The control section 101 is provided with a CPU peripheral section that includes a CPU 1505, a RAM 1520, a graphic controller 1575, and a display apparatus 1580 connected to each other by a host controller 1582; an input/output section that includes a communication interface 1530, a hard disk drive 1540, and a CD-ROM drive 1560, all of which are connected to the host controller 1582 by an input/output controller 1584; and a legacy input/output section that includes a ROM 1510, a flexible disk drive 1550, and a input/output chip 1570, all of which are connected to the input/output controller 1584.

The host controller 1582 is connected to the RAM 1520 and is also connected to the CPU 1505 and the graphic controller 1575 accessing the RAM 1520 at a high transfer rate. The CPU 1505 operates to control each section based on programs stored in the ROM 1510 and the RAM 1520. The graphic controller 1575 obtains image data generated by the CPU 1505 or the like on a frame buffer disposed inside the RAM 1520 and displays the image data in the display apparatus 1580. Alternatively, the graphic controller 1575 may internally include the frame buffer storing the image data generated by the CPU 1505 or the like.

The input/output controller 1584 connects the hard disk drive 1540 serving as a relatively high speed input/output apparatus, the communication interface 1530, and the CD-ROM drive 1560 to the host controller 1582. The hard disk drive 1540 stores the programs and data used by the CPU 1505. The communication interface 1530 transmits and receives programs and data by connecting to a network communication apparatus 1598. The CD-ROM drive 1560 reads the programs and data from a CD-ROM 1595 and provides the read information to the communication interface 1530 and to the hard disk drive 1540 via the RAM 1520.

Furthermore, the input/output controller 1584 is connected to the ROM 1510, and is also connected to the flexible disk drive 1550 and the input/output chip 1570 serving as a relatively high speed input/output apparatus. The ROM 1510 stores a boot program performed when the control section 101 starts up, a program relying on the hardware of the control section 101, and the like. The flexible disk drive 1550 reads programs or data from a flexible disk 1590 and supplies the read programs or data to the communication interface 1530 and the hard disk drive 1540 via the RAM 1520. The input/output chip 1570 connects the flexible disk drive 1550 to a variety of input/output apparatuses via, for example, a parallel port, a serial port, a keyboard port, a mouse port, or the like.

A program executed by the CPU 1505 is provided by a user in a state where it is stored in a storage medium, such as the flexible disk 1590, the CD-ROM 1595, or an IC card. The program stored in the storage medium may be compressed or not be compressed. The program is installed from the storage medium to the hard disk drive 1540, and is read by the RAM 1520 to be executed by the CPU 1505.

The program executed by the CPU 1505 causes the control section 101 to function as the infrared light image storing section 105, the timing predicting section 108, the face-direction specifying section 106, the subject position specifying section 107, the image capturing condition determining section 111, the subject position predicting section 109, the subject speed predicting section 110, the visible light image capturing control unit 120, and the visible light image storing section 112, as explained with reference to FIG. 1 through FIG. 10.

The programs shown above may be stored in an external storage medium. In addition to the flexible disk 1590 and the CD-ROM 1595, an optical recording medium such as a DVD or PD, a magnetooptical medium such as an MD, a tape medium, a semiconductor memory such as an IC card, or the like can be used as the recording medium. Furthermore, a storage apparatus such as a hard disk or a RAM disposed in a server system connected to a dedicated communication network or the Internet may be used as the storage medium and the programs may be provided to the control section 101 via the network.

Although some aspects of the present invention have been described by way of exemplary embodiments, it should be understood that those skilled in the art might make many changes and substitutions without departing from the spirit and the scope of the present invention which is defined only by the appended claims.

What is claimed is:

1. An image capturing system comprising:
an infrared light image capturing section that successively captures a plurality of infrared light images of a subject, by means of infrared light;
a timing predicting section that predicts timing at which the subject included in the plurality of infrared light images matches a predetermined condition, based on timing at which each of the plurality of infrared light images is captured and image content of the plurality of infrared light images; and
a visible light image capturing section that captures a visible light image by means of visible light at the timing predicted by the timing predicting section.

2. The image capturing system as set forth in claim 1, further comprising:
a face-direction specifying section that specifies a direction of a face of a person included in each of the plurality of infrared light images, wherein
the timing predicting section predicts timing at which the face of the person is directed to a predetermined direction, based on the timing at which each of the plurality of infrared light images is captured and the direction of the face specified by the face-direction specifying section.

3. The image capturing system as set forth in claim 2, wherein
the timing predicting section calculates a rotation speed of the head of the person, based on the timing at which each of the plurality of infrared light images is captured and the direction of the face of the person included in each of the plurality of infrared light images specified by the face-direction specifying section, and specifies the timing at which the face of the person is directed to the predetermined direction, based on the calculated rotation speed.

4. The image capturing system as set forth in claim 1, further comprising:
a subject position specifying section that specifies a position of a predetermined subject included in each of the plurality of infrared light images, wherein
the timing predicting section predicts timing at which the predetermined subject exists in a predetermined position, based on the timing at which each of the plurality of infrared light images is captured and the position specified by the subject position specifying section.

5. The image capturing system as set forth in claim 4, wherein
the timing predicting section calculates a speed at which the predetermined subject moves, based on the timing at which each of the plurality of infrared light images is captured and the position of the predetermined subject included in each of the plurality of infrared light images specified by the subject position specifying section, and predicts the timing at which the predetermined subject exists in the predetermined position based on the calculated speed.

6. The image capturing system as set forth in claim 4, further comprising:
a face-direction specifying section that specifies a direction of a face of a person included in each of the plurality of infrared light images, wherein
the subject position specifying section specifies a position of the person included in each of the plurality of infrared light images, and
the timing predicting section predicts timing at which the face of the person is directed to a predetermined direction at a predetermined position, based on the timing at which each of the plurality of infrared light images is captured, the direction of the face specified by the face-direction specifying section, and the position of the person specified by the subject position specifying section.

7. The image capturing system as set forth in claim 1, further comprising:
an image capturing condition determining section that determines an image capturing condition used by the visible light image capturing section in capturing the visible light image at the timing predicted by the timing predicting section, based on the image content of the plurality of infrared light images, wherein
the visible light image capturing section captures the visible light image under the image capturing condition determined by the image capturing condition determining section and at the timing predicted by the timing predicting section.

8. The image capturing system as set forth in claim 7, further comprising:
a subject position specifying section that specifies a position of a predetermined subject included in each of the plurality of infrared light images based on the image content of the plurality of infrared light images; and
a subject position predicting section that predicts a position of the predetermined subject at the timing predicted by the timing predicting section, based on the position specified by the subject position specifying section, wherein
the image capturing condition determining section determines a focal position at which the visible light image capturing section is able to capture an image of the subject in the position predicted by the subject position predicting section, and
the visible light image capturing section performs image capturing by focusing onto the focal position determined by the image capturing condition determining section, at the timing predicted by the timing predicting section.

9. The image capturing system as set forth in claim 7, further comprising:
a subject position specifying section that specifies a position of a predetermined subject included in each of the plurality of infrared light images based on the image content of the plurality of infrared light images; and
a subject position predicting section that predicts a position of the predetermined subject at the timing predicted by the timing predicting section, based on the position specified by the subject position specifying section, wherein
the image capturing condition determining section determines an image capturing direction in which the visible light image capturing section is able to capture an image of the subject in the position predicted by the subject position predicting section, and
the visible light image capturing section performs image capturing in the image capturing direction determined by the image capturing condition determining section, at the timing predicted by the timing predicting section.

10. The image capturing system as set forth in claim 7, further comprising:
a subject position specifying section that specifies a position of a predetermined subject included in each of the plurality of infrared light images based on the image content of the plurality of infrared light images; and
a subject position predicting section that predicts a position of the predetermined subject at the timing predicted by the timing predicting section, based on the position specified by the subject position specifying section, wherein
the image capturing condition determining section determines a field angle in which the visible light image capturing section is able to capture an image of the subject in the position predicted by the subject position predicting section, and
the visible light image capturing section performs image capturing in the field angle determined by the image capturing condition determining section, at the timing predicted by the timing predicting section.

11. The image capturing system as set forth in claim 7, further comprising:
a subject position specifying section that specifies a position of a predetermined subject included in each of the plurality of infrared light images based on the image content of the plurality of infrared light images; and
a subject speed predicting section that predicts a speed at which the predetermined subject moves at the timing predicted by the timing predicting section based on the position specified by the subject position specifying section, wherein
the image capturing condition determining section determines a larger image capturing rate used by the visible light image capturing section in performing image capturing when the subject speed predicting section predicts a faster speed, and
the visible light image capturing section performs image capturing at the image capturing rate determined by the image capturing condition determining section, at the timing predicted by the timing predicting section.

12. The image capturing system as set forth in claim 7, further comprising:
- a subject position specifying section that specifies a position of a predetermined subject included in each of the plurality of infrared light images based on the image content of the plurality of infrared light images; and
- a subject position predicting section that predicts a position of the predetermined subject at the timing predicted by the timing predicting section, based on the position specified by the subject position specifying section, wherein
- the image capturing condition determining section determines a larger resolution used by the visible light image capturing section in performing image capturing when the visible light image capturing section captures a smaller image of the predetermined subject in the position predicted by the subject position predicting section, and
- the visible light image capturing section performs image capturing at the resolution determined by the image capturing condition determining section, at the timing predicted by the timing predicting section.

13. The image capturing system as set forth in claim 1, further comprising:
- a visible light irradiating section that irradiates visible light to at least a partial region of an image capturing range of the visible light image capturing section, at the timing predicted by the timing predicting section, wherein
- the visible light image capturing section captures the visible light image in synchronization with timing at which the visible light irradiating section irradiates visible light.

14. The image capturing system as set forth in claim 13, wherein
- a plurality of visible light irradiating sections are provided, and
- the image capturing system further comprises:
  - a visible light irradiating section selecting section that selects one of the plurality of visible light irradiating sections that is caused to irradiate visible light at the timing predicted by the timing predicting section, based on the timing at which each of the plurality of infrared light images is captured and the image content of the plurality of infrared light images; and
  - a visible light irradiating control section that causes the visible light irradiating section selected by the visible light irradiating section selecting section to irradiate visible light at the timing predicted by the timing predicting section.

15. The image capturing system as set forth in claim 14, wherein
- the visible light irradiating section selecting section selects one of the plurality of visible light irradiating sections that is caused to irradiate visible light at the timing predicted by the timing predicting section, based on a motion of a predetermined subject specified based on the timing at which each of the plurality of infrared light images is captured and the image content of the plurality of infrared light images.

16. The image capturing system as set forth in claim 15, wherein
- the visible light irradiating section selecting section selects one of the plurality of visible light irradiating sections whose at least one of a positional relation with respect to a position of the predetermined subject and a relation between a direction of the predetermined subject and an irradiation direction of visible light is predicted to match a predetermined condition, based on a motion of the predetermined subject.

17. The image capturing system as set forth in claim 1, wherein
- a plurality of visible light image capturing sections are provided, and
- the image capturing system further comprises:
  - a visible light image capturing section selecting section that selects one of the plurality of visible light image capturing sections that is caused to capture the visible light image, based on the timing at which each of the plurality of infrared light images is captured and the image content of the plurality of infrared light images; and
  - a visible light image capturing control section that causes the visible light image capturing section selected by the visible light image capturing section selecting section to capture the visible light image at the timing predicted by the timing predicting section.

18. The image capturing system as set forth in claim 17, wherein
- the visible light image capturing section selecting section selects one of the plurality of visible light image capturing sections that is caused to capture the visible light image, based on a motion of a predetermined subject specified based on the timing at which each of the plurality of infrared light images is captured and the image content of the plurality of infrared light images.

19. The image capturing system as set forth in claim 18, wherein
- the visible light image capturing section selecting section selects one of the plurality of visible light image capturing sections whose at least one of a positional relation with respect to a position of the predetermined subject and a relation between a direction of the predetermined subject and an image capturing direction is predicted to match a predetermined condition, as a visible light image capturing section that captures the visible light image, based on the motion of the predetermined subject.

20. The image capturing system as set forth in claim 19, wherein
- the timing predicting section predicts timing at which the predetermined subject matches a predetermined condition, based on the motion of the predetermined subject.

21. The image capturing system as set forth in claim 20, wherein
- the timing predicting section predicts timing at which at least one of a positional relation between the visible light image capturing section selected by the visible light image capturing section selecting section and the predetermined subject and a relation between an image capturing direction of the visible light image capturing section selected by the visible light image capturing section selecting section and a direction of the predetermined subject matches a predetermined condition, based on the motion of the predetermined subject.

22. An image capturing method comprising:
- an infrared light image capturing step of successively capturing a plurality of infrared light images of a subject, by means of infrared light;
- a timing predicting step of predicting timing at which the subject included in the plurality of infrared light images matches a predetermined condition, based on timing at which each of the plurality of infrared light images is captured and image content of the plurality of infrared light images; and a visible light image capturing step of capturing a visible light image by means of visible light at the timing predicted in the timing predicting step.

23. A computer program product for an image capturing system, the product having computer instructions, recordable on a non-transitory computer readable storage medium, for enabling a computer executing the computer instructions to cause the image capturing system to function as:

an infrared light image capturing section that successively captures a plurality of infrared light images of a subject, by means of infrared light;

a timing predicting section that predicts timing at which the subject included in the plurality of infrared light images matches a predetermined condition, based on timing at which each of the plurality of infrared light images is captured and image content of the plurality of infrared light images; and a visible light image capturing section that captures a visible light image by means of visible light at the timing predicted by the timing predicting section.

* * * * *